Oct. 13, 1964 T. E. DOWNS 3,152,451
CONTROL SYSTEM
Filed May 23, 1963 2 Sheets-Sheet 1

INVENTOR
*Thomas E. Downs*

BY *Claude Funkhouser*
ATTORNEY

United States Patent Office 3,152,451
Patented Oct. 13, 1964

3,152,451
CONTROL SYSTEM
Thomas E. Downs, Pineland, Tex., assignor, by mesne assignments, to the United States of America as represented by the Secretary of the Navy
Filed May 23, 1963, Ser. No. 282,821
10 Claims. (Cl. 62—3)

The present invention relates generally to improvements in control apparatus and the like, and more particularly to new and improved semiconductor control circuitry wherein variations in physical conditions are controlled within closer tolerances than heretofore possible.

One of the most critical problems confronting designers of control apparatus has been the development of light weight rugged control circuitry suitable for military applications and avoiding the necessity of having large power supplies associated therewith. This invention fulfills these requirements and further maintains closer limits of control than systems of the prior art.

An object of the present invention is the provision of control apparatus which will provide a signal of either polarity and proportional to a physical condition to be controlled.

Another object is to provide apparatus to correct deviations from any of a number of preselected physical conditions over a large range within heretofore unobtainable tolerances, such apparatus being light weight and otherwise suitable for military application.

A further object of the invention is the provision of means for switching a signal to either of two channels dependent upon the polarity of the input signal.

Yet another object of the present invention is the provision of gating means which gate signals from an energy source, said signals being proportional to the magnitude and duration of input signals applied thereto.

Figure 1:
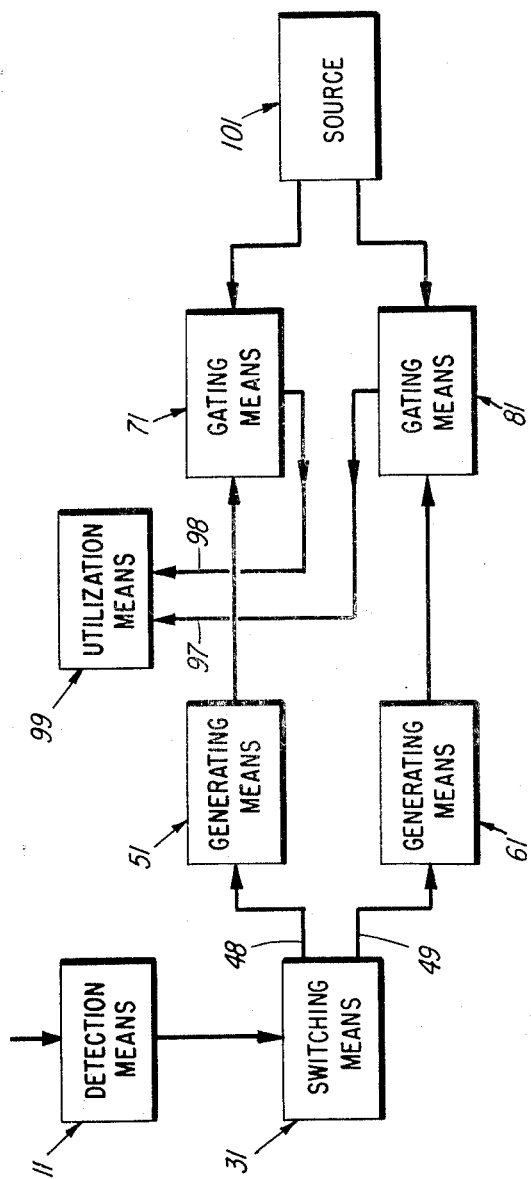
Figure 2:
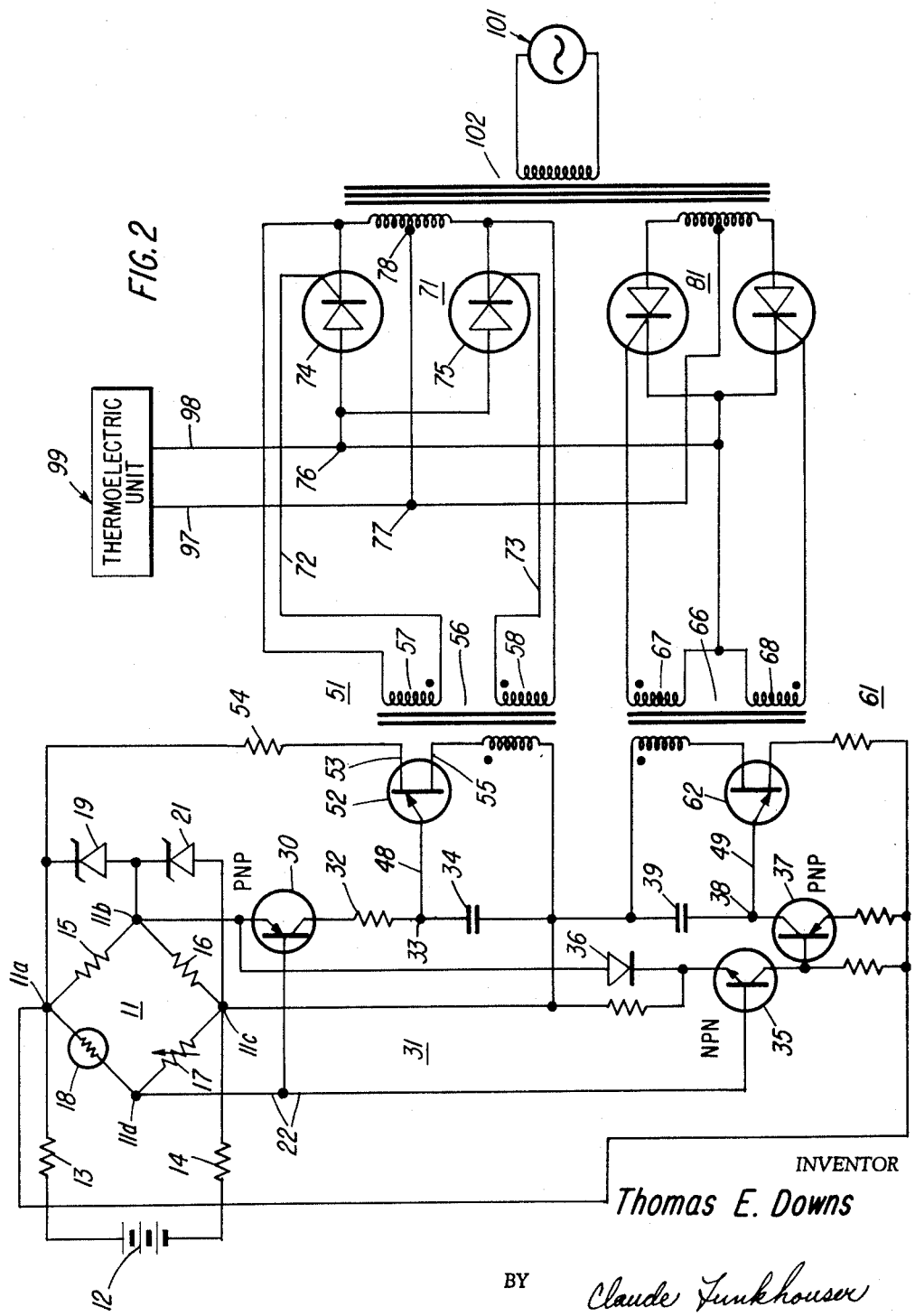

Other objects and many of the attendant advantages of this invention will be readily appreciated as the same becomes better understood by reference to the following detailed description when considered in connection with the accompanying drawings wherein:

FIG. 1 illustrates a block diagram of the invention;
FIG. 2 shows a circuit diagram of a preferred embodiment of the invention.

Referring now to the drawing wherein like reference characters designate like or corresponding parts throughout the several figures, there is shown in FIG. 1 a block diagram of the subject invention wherein the input to a detection means 11 is a variation from a preselected physical condition such as a change in temperature, humidity, or pressure from a preselected ambient; the change in course of a vehicle; or the like. Variations of this sort are sensed by a device such as a temperature sensitive resistor, humidity sensitive resistor or any such sensor, dependent upon the nature of the condition to be monitored. The variation sensed is converted to a signal proportional to the amount of deviation from the norm and of a polarity indicative of the direction of variation. This signal developed in the detection means passes to switching means 31.

The switching means is arranged in a manner whereby, dependent upon the polarity of the signal applied, it switches the signal to one of the generating means 51 or 61. For example, if the signal applied to the switching means is of a negative polarity, it will be switched along path 48 to generating means 51.

The generating means 51 and 61 generate a quantity of gating signals proportional to the change in conditions sensed by detection means 11. This signal is applied to the corresponding one of the gating means 71 and 81 associated with the generating means from which the gating signal is generated.

The gating means convert the energy from the source of voltage 101, to a voltage proportional in duration to the number of gating signals applied thereto and hence proportional to the deviation from the preselected physical quantity. This voltage is applied to the utilization device 99 which may be a meter, thermoelectric unit, servomotor or any such device. If the deviation is in a negative sense, the gating signals from generating means 51 will be applied to gating means 71 and voltage from the source 101 will be allowed to pass to the utilization device 99 for a duration in proportion to the change thus allowing the utilization device to correct the change in condition.

FIG. 2 illustrates the circuitry of an embodiment of the invention. A thermistor sensing device 18 and thermoelectric utilization device 99 are shown. It is obvious, however, that any such combination of sensing and utilization devices could be substituted therefor, dependent upon the particular application the system is designed for.

Recently, thermoelectric devices have been developed which can efficiently heat or cool an area such as the space where crystals in a transmitter are mounted. These devices have many advantages over those used previously; they are very small, they have no moving parts, they operate at very low voltages (of the order of one volt), and all that has to be done to convert from a heating mode to a cooling mode is change the direction of current flow through the device. The control system of the present invention is compatible for use with such a thermoelectric element. With the embodiment of the control system shown in FIG. 2, and a thermoelectric unit as described above, temperature ambients from −10° C. to 71° C. have been maintained within ½° C.

Turning again to FIG. 2, a battery 12 supplies a D.C. voltage through dropping resistors 13 and 14 across terminals 11a and 11c of thermistor bridge 11 which operates as a detection means. The bridge consists of two conventional resistors 15 and 16 connected at terminal 11b, variable resistor 17 connected to resistor 16 at terminal 11c, and a thermistor 18 connected between variable resistor 17 and resistor 15 at terminals 11d and 11a, respectively. Zener diodes 19 and 21 are connected across terminals 11a, 11b and 11b, 11c, respectively, to provide a regulated voltage across the bridge. These diodes further function to provide a constant voltage at terminal 11b, the purpose of which will be discussed below.

Terminal 11d is connected to the base of a PNP transistor 30 via lead 22. The emitter of transistor 30 is connected to terminal 11b for biasing the transistor while the collector is connected through resistor 32 and terminal 33 to capacitor 34. Another path from terminal 11d is furnished to the base of NPN transistor 35, which transistor is of complementary conductivity to transistor 31. The emitter of transistor 35 is biased by connection to terminal 11b, through diode 36. The collector of transistor 35 is connected to another transistor 37, a PNP transistor, identical to transistor 30. The collector of transistor 37 is connected at terminal 38 to capacitor 39, the other side of which is common with capacitor 34. Leads 48 and 49 connect the outputs of the switching means (transistors 30 and 37) to generating means 51 and 61.

The lead 48 connects the unijunction transistor 52 to terminal point 33. Terminal 53 of the unijunction is connected to resistor 54, the function of which will be disclosed later. The output of the unijunction transistor 52 is fed from terminal 55 to a transformer 56. In a similar manner, generating means 61 is connected between output terminal 38 of transistor 37 to transformer 66. Both of the generating means 51 and 61 may be of identical construction. The output coils of transformers 56 and 66 are split forming coils 57 and 58, and 67 and 68, respectively. These coils feed gating signals to the gating means 71 and 81.

Gating means 71 receives gating signals over leads 72 and 73 from generating means 51. The gating means 71 comprises a pair of silicon control rectifiers 74 and 75, the cathodes of which are tied to terminal 76 and the anodes of which are tied to terminal 77 through coil 78, one of the output coils of transformer 102. The input coil of the transformer 102 is across a source 101 which in the present embodiment is of the value 117 v., 400 cycle. The transformer 102 has an input ratio of 17:1:1 thereby providing the low voltage necessary for the operation of the thermo unit. The gating means 81 is identical to gating means 71 with the exception that the rectifiers are reversed. Leads 97 and 98 connect the thermoelectric unit 99 to gating means 71 and 81. The thermoelectric unit may be of the type discussed above.

Considering the operation of the system of FIG. 2, the variable resistor 17 is set to correspond to the selected ambient temperature desired to be maintained and assuming that the ambient state is initially at this temperature, the bridge is balanced. If the temperature sensed by the thermistor 18 drops below this ambient, the voltage of the bridge is upset causing a negative voltage to appear across the bridge, in a conventional manner causing a current flow of negative direction in lead 22. This current causes transistor 30 to conduct heavily. When the system is at rest, no voltage appearing at the thermo unit, transistors 30 and 35 are conducting slightly. The voltage of the bridge is set slightly negative to compensate for this conduction. Capacitor 34 is charged in proportion to the current flow through transistor 30. The firing voltage of unijunction 52 is determined by the voltage at terminal 53, thus resistor 54 biases the unijunction and determines the firing level.

As the voltage at terminal 33 builds up, and until it reaches a level sufficient to fire the unijunction, the unijunction acts as a large resistance preventing any signal from passing through. When the bias at point 53 is overcome, the unijunction fires and capacitor 34 is discharged. The pulse from the unijunction is applied to the secondaries of transformer 56 and from there to the gating leads of silicon control rectifiers 74 and 75.

These rectifiers (diodes 74 and 75) operate in much the same manner as conventional diodes. However, current flow is blocked in the forward direction in the absence of a signal on the gating lead. When a signal is applied to this lead, the diode will conduct in a forward direction and will continue to conduct through the remainder of a cycle, even though the gating signal is removed.

Therefore, for each gating signal appearing on lines 72 and 73 the rectifiers 74 and 75 each conduct during a half cycle and thereby deliver a full wave rectified voltage to the thermoelectric unit. Lead 97 is positive with respect to lead 98 and causes the unit to produce heat.

If, on the other hand, the temperature at thermistor 18 rises above the ambient, a positive voltage unbalance appears across the bridge causing a positive current in conductor 22. This current causes transistor 35 to conduct more heavily, whereby the current flow in the collector circuit causes the base of transistor 37 to become more negative until this transistor begins to conduct. Transistor 37 functions as an inverter and enables the remainder of the circuits in this path to be substantially a duplicate of that connected to transistor 31. These circuits operate in the same manner as those described above, but for the reversal of the silicon control rectifiers in gating means 81, which reversal impresses a negative voltage across the thermoelectric unit. Because of the negative voltage the unit provides cooling.

In either mode of operation, correction of a positive or negative change, the unbalance causes a signal of amplitude proportional to the variation, such that the transistor switches conduct, charging the capacitors, thereby firing the unijunction a number of times proportional to the deviation from the ambient. In turn, for each firing, a gating signal is applied to the silicon control rectifiers, and thus energy from the source is gated to the utilization device such that the duration energy is allowed to pass from the source is proportional to the amplitude of the change and of a polarity to cause correction.

Thus, a small, light weight and easily packageable control system using a small power source has been provided. Further, the components are of a nature to readily adapt to military uses.

Obviously many modifications and variations of the present invention are possible in the light of the above teachings. It is therefore to be understood that within the scope of the appended claims the invention may be practiced otherwise than as specifically described.

What is claimed is:

1. A control system comprising:
    (a) detection means for sensing variations from a preselected physical condition and for converting said variations to amplitude variable direct current voltage signals indicative of said variation;
    (b) a plurality of generating means for generating gating signals proportional in number to excursions of said D.C. voltage signals from a norm;
    (c) switching means connecting said plurality of generating means and said detection means, for switching said voltage signals to one of said plurality of generating means;
    (d) means for utilizing said variations;
    (e) a plurality of gating means connected to said generating means and said utilization means and a source of energy, for gating energy in response to said gating signals to said utilization means.

2. In the control system of claim 1, the detection means comprising:
    (a) a bridge circuit, one arm of which includes a condition responsive element, whereby said voltage signals are of one polarity if said variations are in one sense and of the other polarity if said variations are of another sense.

3. In the control system of claim 2 the switching means comprising:
    (a) a single input terminal;
    (b) a first output channel including,
        (1) a first transistor operatively connected to said input terminal;
    (c) a second output channel further including
        (1) a second transistor operatively connected to said input terminal and of opposite conductivity to said first transistor,
        (2) a third transistor of the same conductivity as said first transistor and operatively connected to said second transistor, whereby said voltage signal appearing at said input terminal passes through said first channel if it is of said one polarity and passes through said second channel if it is of said other polarity.

4. In the control system of claim 2, wherein each of said plurality of generating means comprises:
    (a) a unijunction transistor wherein the amplitude of said voltage signals control the firing level of said unijunctions.

5. In the control system of claim 2, said plurality of generating means comprising:
    (a) a first generating means including a first unijunction transistor;
    (b) a second generating means including a second unijunction transistor; wherein the amplitude of said voltage signal determines the firing level of said first and second unijunctions, and a signal of said one polarity will fire said first unijunction and a signal of said other polarity will fire said second unijunction, thereby providing said gating signals.

6. In the control system of claim 5, said plurality of generating means further comprising:
   (a) a first transformer with a primary winding and a pair of secondary windings, said primary operatively connected to said first unijunction;
   (b) a second transformer with a primary winding and a pair of secondary windings, said primary operatively connected to said second unijunction; whereby said gating signals appear simultaneously on each of said secondaries of said first and second transformers.

7. In the control system of claim 6, said gating means comprising:
   (a) a first gating circuit including a pair of gating diodes responsive to said gating signals from said first transformer;
   (b) a second gating circuit including a second pair of gating diodes, responsive to said gating signals from said second transformer.

8. In the control apparatus of claim 7 wherein
   (a) said first gating diodes are connected in a manner to allow conduction from said source in one direction; and
   (b) said second gating diodes are connected in a manner to allow conduction from said source in another direction.

9. A control system for detecting variations from a preselected condition, comprising:
   (a) a bridge circuit having an output terminal, one arm of said bridge circuit including a condition responsive element;
   (b) a generating circuit including
      (1) a first and a second unijunction transistor,
      (2) a first and a second transformer each having a single primary winding and a pair of secondary windings, said first and second primary windings connected to said first and second unijunction transistors respectively;
   (c) switching circuitry including
      (1) a single input terminal connected to said output of said bridge
      (2) a first channel including a first transistor operatively connected between said input terminal and said first unijunction transistor
      (3) a second channel including a second transistor connected to a third transistor of opposite conductivity to said second transistor, and operatively connected to said second unijunction transistor, said second transistor operatively connected between said input terminal and said second transistor
   (d) a source of electrical energy
   (e) utilization means for correcting said variations
   (f) gating circuitry including
      (1) a first pair of gating elements operatively connected to the secondaries of said first transformer, said source, and said utilization means
      (2) a second pair of gating elements operatively connected to the secondaries of said second transformer, said source, and said utilization means whereby voltage from said source is impressed upon said utilization means of an amplitude proportional to said variation and of one polarity if said variation is of one sense and of the other polarity if said variation is of another sense.

10. In the control system of claim 9 wherein:
   (a) said condition responsive element consists of a thermistor and
   (b) said utilization means is a thermoelectric unit whereby said bridge is effective to measure variations in temperature from a selected ambient and said thermoelectric unit corrects said variations under the control of the system.

References Cited in the file of this patent
UNITED STATES PATENTS

| | | |
|---|---|---|
| 2,731,551 | Stafford | Jan. 17, 1956 |
| 2,900,530 | Rowland | Aug. 18, 1959 |
| 2,949,259 | Bell | Aug. 16, 1960 |
| 2,997,606 | Hamburger et al. | Aug. 22, 1961 |
| 3,107,324 | Wright | Oct. 15, 1963 |
| 3,111,008 | Nelson | Nov. 19, 1963 |